US008785757B2

(12) United States Patent
Pillhofer et al.

(10) Patent No.: US 8,785,757 B2
(45) Date of Patent: Jul. 22, 2014

(54) MUSICAL INSTRUCTION AND ASSESSMENT SYSTEMS

(71) Applicant: Apple Inc., Cupertino, CA (US)

(72) Inventors: Stefan Pillhofer, Hamburg (DE); Jan-Hinnerk Helms, Hamburg (DE); Gerhard Lengeling, Los Altos Hills, CA (US); Alexander Soren, San Francisco, CA (US); Alexander Harry Little, Woodside, CA (US); John Danty, Calgary (CA); Timothy B. Martin, Sunnyvale, CA (US); Matt Evans, San Francisco, CA (US); Ole Lagemann, Hamburg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/725,824

(22) Filed: Dec. 21, 2012

(65) Prior Publication Data

US 2013/0233152 A1    Sep. 12, 2013

Related U.S. Application Data

(63) Continuation of application No. 12/766,707, filed on Apr. 23, 2010, now Pat. No. 8,338,684.

(51) Int. Cl.
*G09B 15/00* (2006.01)

(52) U.S. Cl.
USPC ........................................................ 84/470 R

(58) Field of Classification Search
USPC ........................................................ 84/470 R
See application file for complete search history.

(56) References Cited

U.S. PATENT DOCUMENTS

| 4,506,580 A | 3/1985 | Koike |
| 5,130,966 A | 7/1992 | Yoshio et al. |
| 5,287,789 A | 2/1994 | Zimmerman |
| 5,395,123 A | 3/1995 | Kondo |
| 5,434,949 A | 7/1995 | Jeong |
| 5,544,562 A | 8/1996 | Jeon |
| 5,557,056 A | 9/1996 | Hong et al. |
| 5,563,358 A | 10/1996 | Zimmerman |
| 5,585,583 A | 12/1996 | Owen |
| 5,690,496 A | 11/1997 | Kennedy |
| 5,728,960 A | 3/1998 | Sitrick |
| 5,804,752 A | 9/1998 | Sone et al. |
| 5,886,273 A | 3/1999 | Haruyama |
| 5,889,224 A | 3/1999 | Tanaka |
| 5,952,597 A | 9/1999 | Weinstock et al. |
| 6,084,168 A | 7/2000 | Sitrick |
| 6,107,559 A | 8/2000 | Weinstock et al. |
| 6,166,314 A | 12/2000 | Weinstock et al. |
| 6,342,663 B1 | 1/2002 | Kato |
| 6,495,747 B2 | 12/2002 | Shimaya et al. |
| 6,541,692 B2 | 4/2003 | Miller |

(Continued)

FOREIGN PATENT DOCUMENTS

| GB | 2349736 | 11/2000 |
| WO | WO 9317408 | 9/1993 |

*Primary Examiner* — Robert W Horn
(74) *Attorney, Agent, or Firm* — Fish & Richardson P.C.

(57) ABSTRACT

The invention relates to systems, methods, and apparatus for assessing a musical performance. The musical performance can include a user's performance of a musical instrument. MIDI or audio notes are input and compared to the notes of a music track. An indication is provided to assess the musical performance. The assessment can be on the basis of timing and/or pitch errors.

24 Claims, 12 Drawing Sheets

(56) References Cited

U.S. PATENT DOCUMENTS

| | | |
|---|---|---|
| 6,751,439 B2 | 6/2004 | Tice et al. |
| 7,098,392 B2 | 8/2006 | Sitrick et al. |
| 7,129,407 B2 | 10/2006 | Hiratsuka et al. |
| 7,157,638 B1 | 1/2007 | Sitrick |
| 7,164,076 B2 | 1/2007 | McHale et al. |
| 7,271,329 B2 | 9/2007 | Franzblau |
| 7,297,856 B2 | 11/2007 | Sitrick |
| 7,323,629 B2 | 1/2008 | Somani et al. |
| 7,361,829 B2 | 4/2008 | Uehara |
| 7,423,213 B2 | 9/2008 | Sitrick |
| 7,446,253 B2 | 11/2008 | Knapp et al. |
| 7,459,624 B2 | 12/2008 | Schmidt et al. |
| 7,470,856 B2 | 12/2008 | Jung et al. |
| 7,518,057 B2 | 4/2009 | Worrall et al. |
| 7,579,541 B2 | 8/2009 | Guldi |
| 7,595,443 B2 | 9/2009 | Yagi |
| 7,612,278 B2 | 11/2009 | Sitrick et al. |
| 7,806,759 B2 | 10/2010 | McHale et al. |
| 7,851,689 B2 | 12/2010 | Reynolds et al. |
| 7,893,337 B2 | 2/2011 | Lenz |
| 7,906,720 B2 | 3/2011 | Delorme |
| 7,910,818 B2 | 3/2011 | Kim et al. |
| 7,923,620 B2 | 4/2011 | Foster |
| 8,338,684 B2 * | 12/2012 | Pillhofer et al. ............ 84/470 R |
| 2004/0123726 A1 | 7/2004 | Kato et al. |
| 2004/0221707 A1 | 11/2004 | Hiratsuka et al. |
| 2005/0255914 A1 | 11/2005 | McHale et al. |
| 2007/0256543 A1 | 11/2007 | Evans et al. |
| 2010/0089221 A1 | 4/2010 | Miller |
| 2010/0162878 A1 | 7/2010 | Lengeling et al. |
| 2010/0162880 A1 * | 7/2010 | Luedecke et al. ............... 84/645 |
| 2012/0135789 A1 | 5/2012 | Feidner |
| 2013/0233157 A1 * | 9/2013 | Lengeling ...................... 84/634 |

* cited by examiner

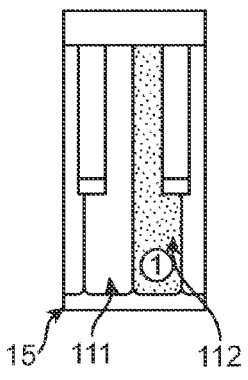
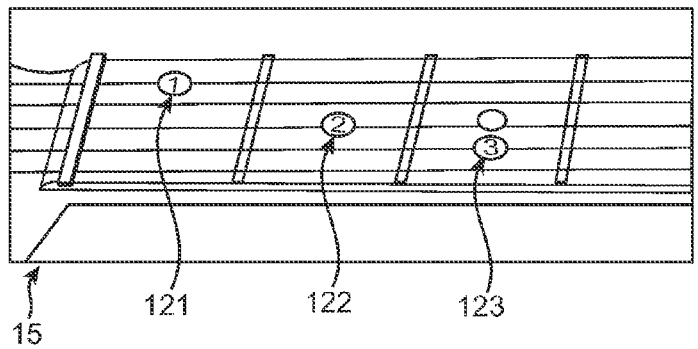
FIG. 11  FIG. 12
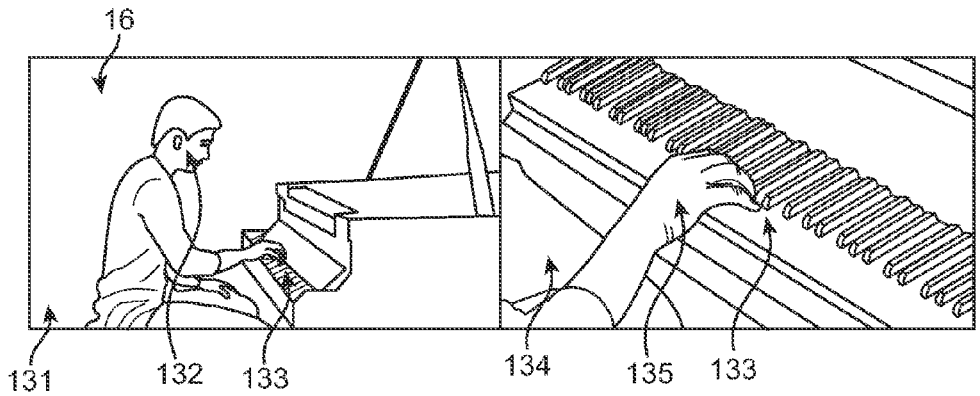
FIG. 13
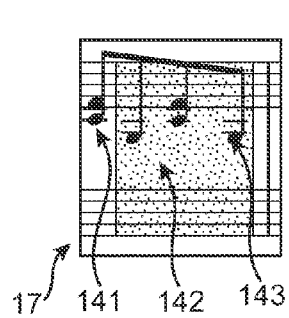
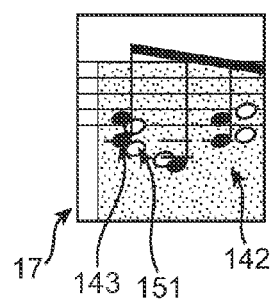
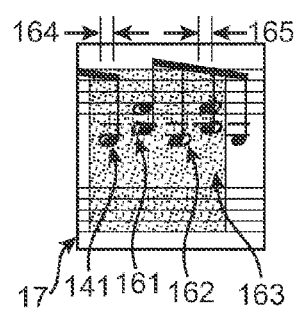
FIG. 14  FIG. 15  FIG. 16

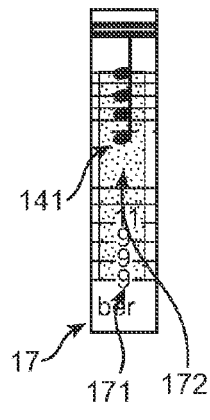
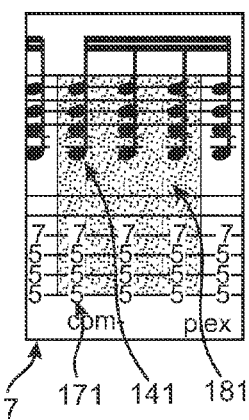
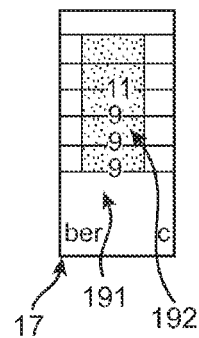
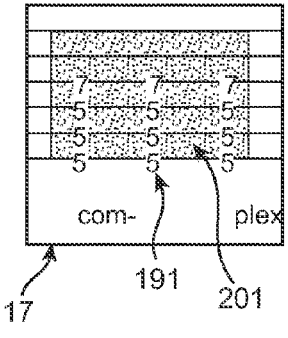
FIG. 17  FIG. 18  FIG. 19  FIG. 20
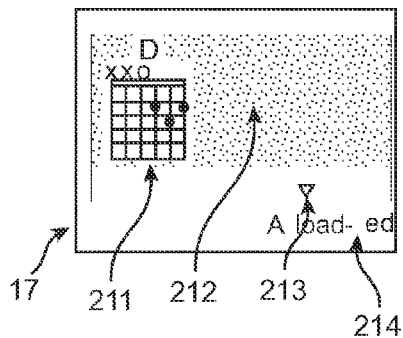
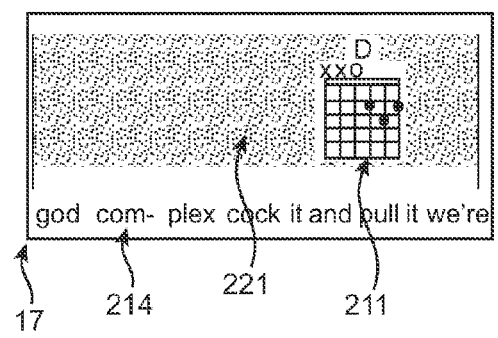
FIG. 21  FIG. 22
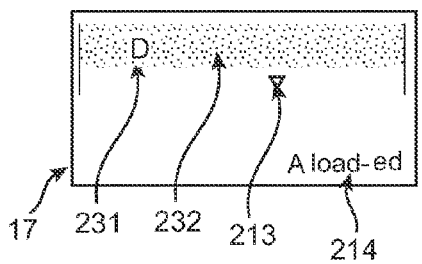
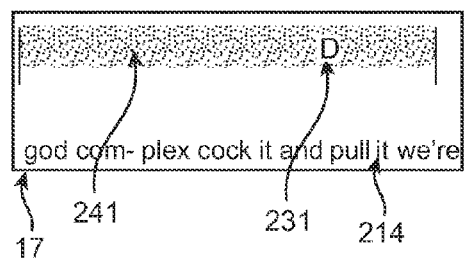
FIG. 23  FIG. 24

MUSICAL INSTRUCTION AND ASSESSMENT SYSTEMS

CROSS-REFERENCE TO RELATED APPLICATIONS

This application is a continuation of and claims priority to U.S. application Ser. No. 12/766,707, entitled "Musical Instruction and Assessment Systems," filed on Apr. 23, 2010, the entire contents of which are incorporated herein by reference.

FIELD

The following relates to computer systems, and more particularly to systems, methods, and apparatus for assessing musical performance.

BACKGROUND

Learning to play a musical instrument can be faster and easier when assessment is provided. A music instructor typically observes a student perform a piece of music and provides assessment. The instructor can provide assessment as the student performs or after the student finishes performing. The instructor can help the student recognize errors. The instructor can provide feedback as to how to correct the errors. The instructor can also help the student track improvement over time.

Hiring a qualified music instructor can be expensive. Moreover, a music instructor is rarely available for each and every practice session. The student is typically left to practice alone, without any form of assessment. Practicing without assessment can result in the development of bad habits.

A need exists, therefore, for systems, methods, and apparatus for assessing musical performance.

SUMMARY

Various embodiments compare a user's performance to a music track or to a musical score and provide real-time and offline assessment of the user's performance. The user's performance can be input as a MIDI signal or as an audio signal. A MIDI signal can be compared directly to a stored musical track or score. An audio signal is first analyzed and then compared with a musical track or score. Both pitch errors and timing errors can be detected during the comparison. The results of the comparison can be displayed to the user in a variety of ways. Many other aspects and examples will become apparent from the following disclosure.

BRIEF DESCRIPTION OF THE DRAWINGS

In order to further explain describe various aspects, examples, and inventive embodiments, the following figures are provided.

FIG. 11 depicts a schematic view of a portion of an instrument region;
FIG. 12 depicts a schematic view of an instrument region;
FIG. 13 depicts a schematic view of a movie region;
FIGS. 14-25 depict schematic views of portions of notation regions according to various embodiments of the invention.

Figure 1:
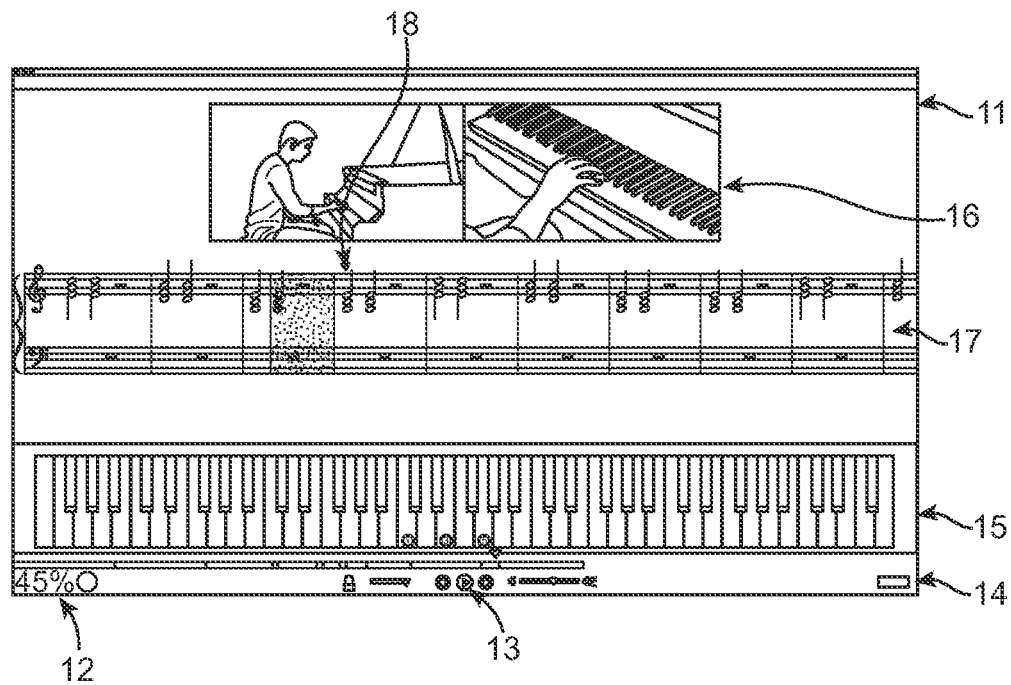
FIG. 1 depicts a schematic view of an assessment user interface.

It should be understood that the various embodiments are not limited to the arrangements and instrumentality shown in the drawings.

DETAILED DESCRIPTION

The functions described as being performed at various components can be performed at other components, and the various components can be combined and/or separated. Other modifications can also be made.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. Numerical ranges include all values within the range. For example, a range of from 1 to 10 supports, discloses, and includes the range of from 5 to 9. Similarly, a range of at least 10 supports, discloses, and includes the range of at least 15.

Thus, the following disclosure describes systems, methods, and apparatus for assessing musical performance. Many other examples and other characteristics will become apparent from the following description.

Offering assessment helps a user learn to play a musical instrument. According to various embodiments, systems, methods, and apparatus provide assessment of a musical performance. The systems, methods, and apparatus can be incorporated into digital audio workstations. The user can be provided with an option to choose whether to be assessed. If the user chooses to be assessed, the user's performance can be received, analyzed, and compared with a music track or a musical score. The results of the comparison can be presented in real-time and offline.

A user's performance can be received in various ways. MIDI (Musical Instrument Digital Interface) is an industry-standard protocol defined in 1982 that enables electronic musical instruments such as keyboard controllers, computers, and other electronic equipment to communicate, control, and synchronize with each other. An incoming MIDI signal can be directly compared to a musical score and/or to a musical track; no further analysis of the incoming MIDI signal is necessary. Incoming audio signals, for example, signals from a microphone or a musical instrument, need to be analyzed in order to be compared to a musical score or to a musical track. Both monophonic and polyphonic signals can be analyzed.

The system can detect individual notes in a polyphonic signal by any method of analysis known to those in the art. For example, the system can convert the polyphonic signal from a time domain to a frequency domain. The system can then analyze fundamental frequency peaks and a set number of related harmonic partial peaks, for each fundamental frequency peak, to determine individuals notes that within the polyphonic signal.

The comparison of the user's performance to the musical score or musical track can include an evaluation of both pitch and timing. As soon as there is a deviation in either pitch or timing or both, the relevant note is considered to be an error. Based on the total number of errors played and the total number of notes in the song, a percentage value of correct notes can be generated. A percentage of pitch errors and a percentage of timing errors can also be determined separately. For example, by only counting pitch errors and relating the number of pitch errors to the total number of notes in the song.

The musical scores and musical tracks to which a user's performance can be compared can be stored in system memory. The musical score can be for any instrument. Existing tracks can be used, for example, a full piano score track can be used, or a guitar tablature can be used. A dedicated track can also be used to hold reference data specifically designed for assessment.

In some situations it can be desirable not to assess certain notes or passages of a lesson. When a particular note or passage is not to be assessed, the assessment can pause. At least three situations exist where certain notes or passages of a lesson should not be assessed. First, a real solo may exist within a lesson. A real solo is a passage that can be specifically labeled within a musical score. A real solo is a passage that can be freely played by the user. A real solo is often of a relatively long duration in comparison to other passages of a score. During a real solo, assessment can be paused. Second, an optional solo may exist within a lesson. An optional solo is a passage that can be specifically labeled within a musical score. An optional solo is a passage where a user more or less follows notation, but has the option to move away from it and play his or her own interpretation. During an optional solo, assessment can be paused. Finally, small data deviations between a score and a teacher audio track may occur, wherein the score and the teacher audio track do not match. During such data deviations assessment can be paused. Information about these exceptions can be stored separately from the lesson. For new lessons, the exceptions can be authored in the lesson directly.

As discussed below, various user interface features can be employed. For example, a user interface element can display the user's performance over the course of a song. A real-time display of the user's performance can be provided. A user interface element can be provided to trigger an assessment results/history view.

Referring to FIG. 1, a schematic view of an assessment user interface 11 is illustrated. Assessment user interface 11 can include one or more of the following user interface elements: a rating region 12, a control region 13, an assessment lane 14, an instrument region 15, a movie region 16, a notation region 17, and a playhead 18. Each user interface element will be described in the context of other Figures.

Figure 2:
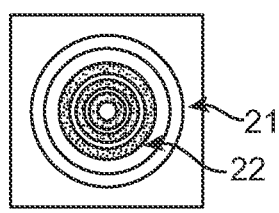
FIG. 2 depicts a schematic view of a recent performance rating.

Referring to FIG. 2, a schematic view of a recent performance rating 21 is illustrated. Recent performance rating 21 can be one element of rating region 12. Recent performance rating 21 can include a graphical depiction 22. Graphical depiction 22 can be a circle graphic including a series of concentric bands of one or more colors. The recent performance rating 21 can provide an assessment of a number of bars of a musical score recently played. For example, in one embodiment the recent performance rating 21 can provide an assessment of the last four bars played. The recent performance rating 21 can indicate the number of correct notes in relation to the total number of notes within the bars assessed. For example, the recent performance rating 21 can indicate the number of correct notes in relation to the total number of notes in the last four bars played. The recent performance rating 21 can indicate the number of correct notes in relation to the total number of notes within the number of bars assessed as a fractional or percentage value. The fractional or percentage value can be displayed graphically as graphical depiction 22. When graphical depiction 22 takes the form of a circle graphic, including one or more concentric bands, colored bands can indicate the percentage value of correctly played notes. The bands can be colored any color, for example green. Thus, in one embodiment, the more bands that are colored green, the higher the percentage value of correctly played notes within the last four bars played. At the conclusion of a score, when the user ends play back, or at anytime when the system is not in a recording state, the graphical depictions can be replaced by a percentage value or a graphical ranking. For example, a series of stars, representing the average recent performance rating can be displayed.

Figure 3:
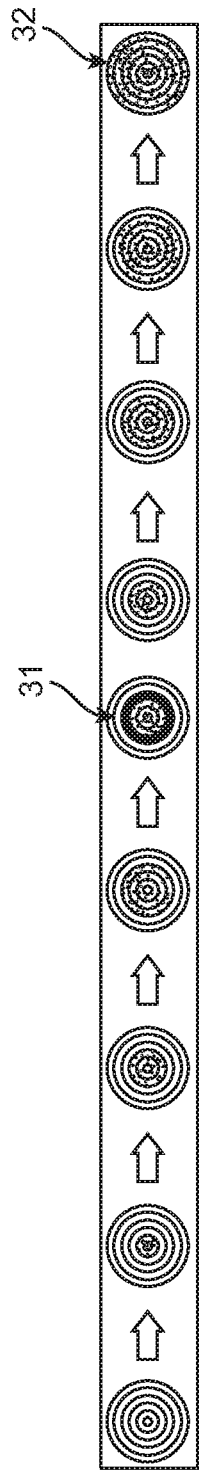
FIG. 3 depicts a series of nine recent performance ratings.

Referring to FIG. 3, a series of nine recent performance ratings 21 is shown. Each of the nine recent performance ratings 21 shows a different state of the graphical depiction 22. In other words, only one graphical depiction 22 is shown at a time, and FIG. 3 illustrates changes to the graphical depiction 22 over time. Moving from left to right in FIG. 3, more concentric bands are colored, indicating a higher percentage of correctly played notes. One graphical depiction 22 shows a highlighted outer concentric band 31 to illustrate that if the user plays a wrong note, the outer band can flash red and then disappear. If the user plays all the notes in the assessed bars correctly, all concentric bands can be colored as shown in fully colored graphical depiction 32.

Figure 4:
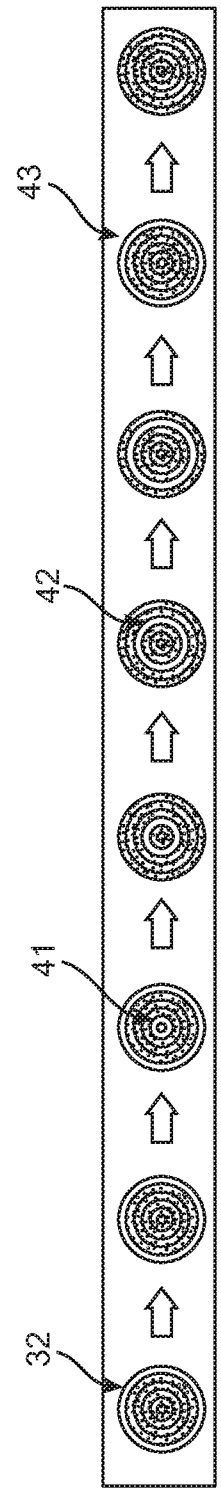
FIG. 4 depicts a series of eight fully colored graphical depictions.

Referring to FIG. 4, a series of eight fully colored graphical depictions 32 is shown. Only one graphical depiction 32 is shown at a time, and FIG. 4 illustrates changes to the graphical depiction 32 over time. When all bands of the graphical depiction are colored, an additional animation can indicate the beats of the currently played lesson. The green rings can be highlighted from inner to outer ring with the highlight reaching the outer ring at the end of the beat. For example, at the beginning of a beat, first ring 41 can be highlighted. Half-way through the beat, middle ring 42 can be highlighted. At the end of the beat, outer ring 43 can be highlighted. The animation can create a pleasing visual pulse that can help the user keep to the beat, and provide a reward to the user for maintaining a high percentage of correctly played notes.

Figure 5:
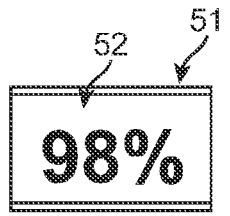
FIG. 5 depicts a schematic view of an overall performance rating.

Referring to FIG. 5, a schematic view of an overall performance rating 51 is shown. Overall performance rating 51 can be one element of rating region 12. Overall performance rating 51 can display the overall performance so far in a given score. Rating 51 can compare notes played correctly against the total number of notes in the part of the lesson played so far. Rating 51 can be displayed as a percentage read-out 52. The appearance, for example, the color, of overall performance rating 51 can be changed depending on the direction of change of the percentage value. For example, if the percentage value of rating 51 increases or stays the same, rating 51 and/or percentage read-out 52 can be shaded green. On the other hand, if the percentage value of rating 51 decreases, rating 51 and/or percentage read-out 52 can be shaded red.

Figure 6:
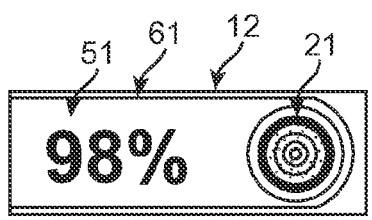
FIG. 6 depicts a schematic view of a rating region.

Referring to FIG. 6, a schematic view of rating region 12 is shown. Rating region 12 includes an overall performance rating 51 and a recent performance rating 21. Rating region 12 can be positioned in the lower strip of the main assessment user interface. The combination of overall performance rating 51 and recent performance rating 21 can be referred to as the power meter 61.

Figure 7:
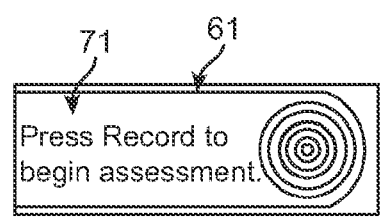
FIG. 7 depicts a schematic view of a power meter.

Referring to FIG. 7, power meter 61 can be replaced with an explanatory text 71, when no assessment has been done. A lesson can be divided into a number of chapters. For example, an instruction chapter, a demonstration chapter, and a play chapter. Display of power meter 61 can be limited to a play chapter of the current lesson. When the power meter 61 is not displayed, explanatory text 71 can be displayed.

Figure 8:
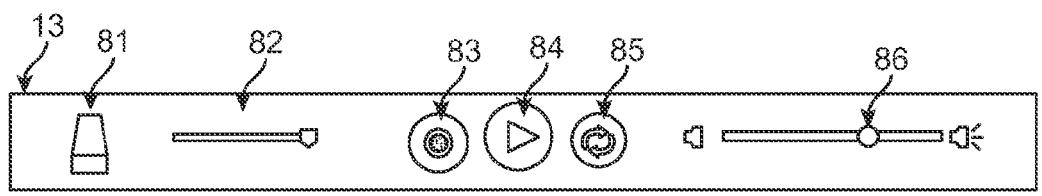
FIG. 8 depicts a schematic view of a control region.

Referring to FIG. 8, a schematic view of control region 13 is shown. The control region 13 can include a metronome 81, which can display a number of beats per measure in the score being practiced. The number of beats per measure, i.e., the tempo, can be controlled by tempo adjustment control 82. Using tempo adjustment control 82, a user can adjust the tempo at which a score is rehearsed. For example, a user can adjust the tempo to half-speed to facilitate practicing at a slower pace. The user can also use tempo adjustment control 82 to practice the musical score at normal speed. Control region 13 can also include various toggle controls, such as a record control 83, a play control 84, and a loop control 85. Record control 83 can toggle between a recording mode and a non-recording mode. In the recording mode, the user's performance can be recorded. Assessment can be performed whenever the user clicks the record control 83, at which time the played performance can be analyzed. The user can receive real-time feedback on his or her performance. The results of the analysis can be stored in system memory. Play control 84 can toggle between a playing mode and a pause mode. In the playing mode, the system can advance through the score, prompting the user to play along. Assessment can be, but need not be performed in playing mode. Loop control 85 can toggle between a looping mode and a non-looping mode. In the looping mode, upon reaching the end of a musical score the system can immediately restart playback or recording of the score. In the non-looping mode, the system can stop playback or recording upon reaching the end of the musical score. Volume control 86 can include a slide bar to adjust the volume of playback.

A lesson can be divided into a number of chapters. For example, a lesson can include an instruction chapter, a demonstration chapter, and a play chapter. Certain user interface controls can be made available in certain chapters but not in other chapters. For example, the record button can be made to be available only in the "play" chapter of a lesson. In other chapters, the record button can be grayed out and made non-functional.

Figure 9:
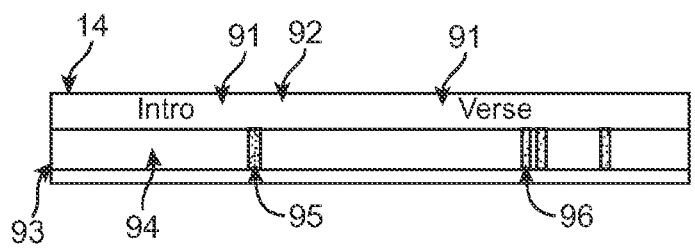
FIG. 9 depicts a schematic view of an assessment lane.

Referring to FIG. 9, a schematic view of an assessment lane 14 is shown. Assessment lane 14 can include a graphical representation of various score segments 91 separated by one or more dividers 92. The score segments 91 can represent sections of the musical score being practiced, for example, introduction, verse, chorus, bridge, and/or refrain. The assessment lane 14 can have a length proportional to the duration of the entire song and score segments 91 can have lengths proportional to the duration of the sections of the song they represent. Assessment lane 14 can also include a performance strip 93 indicating the user's performance. The performance strip 93 can include one or more regions providing a visual evaluation of the user's performance. The one or more regions can have lengths along the performance strip proportional to the duration of the sections of the user's performance being evaluated. The user's performance can be evaluated bar-by-bar or in groups of bars, for example, measure-by-measure. The one or more regions providing a visual evaluation of the user's performance can include one or more of the following areas: a correctly-played area or bar 94, a pitch error area or bar 95, and a timing error area or bar 96. A correctly-played area 94 can indicate that in the section of the score evaluated, the user played all notes correctly and with the correct timing. The correctly-played area 94 can be shaded green. A pitch error area 95 can indicate that in the section of the score evaluated, the user played one or more incorrect notes. The pitch error area 95 can be shaded red. A timing error area 96 can indicate that in the section of the score evaluated, the user played the correct notes, but at incorrect times. The timing error area can be shaded orange. If the section of score being evaluated contains both timing and pitch errors, the relevant segment can be colored red, because, in terms of a musical performance, a pitch error is generally more significant than a timing error. On mouse over of the assessment lane 14, tool tips can appear showing the meaning of the colors. Any visual depiction may be used in place of or in addition to colors, for example, symbols, or blinking areas within the performance strip 93.

Figure 10:
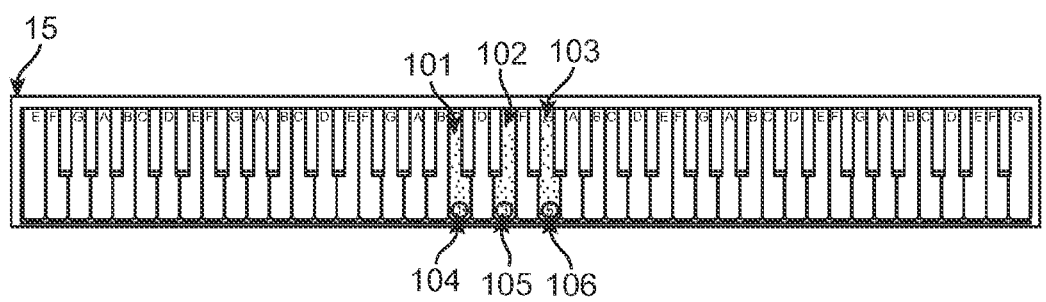
FIG. 10 depicts a schematic view of an instrument region.

Referring to FIG. 10, a schematic view of an instrument region 15 is shown. Instrument region 15 can include a graphical depiction of all or a portion of a musical instrument, such as a piano keyboard. In embodiments of the invention, where instrument region 15 depicts a piano keyboard, keys can be highlighted to designate a chord to be played. For example, first highlighted key 101, second highlighted key 102, and third highlighted key 103 can be highlighted to indicate the keys on the piano keyboard that correspond to a particular chord in a music track or score. Keys can be highlighted in real-time as the music track or score progresses. Fingering indicators can also be positioned on or near the keys. For example, first fingering indicator 104, second fingering indicator 105, and third fingering indicator 106 can be positioned on or near the keys to be played. The fingering indicators can include alphanumerical or symbolic designations, which indicate which finger should be used to play a particular key. For example, the number 1 can be used to indicate the thumb; the number 2 can be used to indicate the index finger; the number 3 can be used to indicate the middle finger; the number 4 can be used to indicate the ring finger; and the number 5 can be used to indicate the pinkie.

Referring to FIG. 11, a portion of an instrument region 15 is shown. In embodiments where instrument region 15 depicts a piano keyboard, the key corresponding to the key actually played by the user can be depicted with an animation of a depressed key 111. The animation of a depressed key 111 can be shown for incorrect notes only or for both correct notes and incorrect notes. When a user plays an incorrect key, visual feedback can be provided by shading the correct key 112. The correct key can be shaded in any color, for example, red to indicate that an error occurred. Pitch errors and timing errors can be shown on the keyboard. In some embodiments only pitch errors are shown.

Referring to FIG. 12, a schematic view of an instrument region 15 is shown. The instrument region 15 can depict a guitar fretboard. Fingering indicators can be displayed on the guitar fretboard to show the fingering position for individual notes or for chords. For example, first fingering indicator 121, second fingering indicator 122, and third fingering indicator 123 can be displayed on the guitar fredboard. Alphanumerical or symbolic designations can be positioned on or near the fingering indicators to indicate which fingers a user should use to depress the strings. For example, the number 1 can be used to indicate the index finger; the number 2 can be used to indicate the middle finger; the number 3 can be used to indicate the ring finger; and the number 4 can be used to indicate the pinkie. Visual feedback can be provided in respose to errors. The visual feedback can be displayed on the fretboard for whole chords or for single notes. For example, if any portion of a chord is played incorrectly, the chord can be shaded red, indicating that the chord was played incorrectly. Visual feedback can also be displayed on the fretboard if a portion of a chord is played incorrectly. For example, an indicator can be displayed on the fretboard, showing the fingering actually played and the correct fingering indicator can be shaded in a different color.

Referring to FIG. 13, a schematic view of a movie region 16 is shown. Movie region 16 can include one or more views. For example, movie region 16 can include a wide-angle view 131 and a close-up view 134. Wide-angle view can include a video, animation, or representation of a demonstrator 132 playing an instrument 133. The close-up view can include a closer view of the demonstrator's hands 135 interacting with the instrument 133. The demonstrator can play the instrument in sync with the music track so that the user can play along with the demonstrator.

Referring to FIG. 14, a portion of a notation region 17 is shown. The notation region can display score notes 141. A user can read the score notes 141 and attempt to play them. If the user does not play the correct notes, a note error area 142 can be displayed. The note error area can include a shaded region behind or in front the notes of the score that were not played correctly. The shaded region can be any color, for example, red. The note error area 142 can be generated to indicate errors in real time. Missed score notes 143 can be shaded in a different color than correct score notes 141. For example, missed score notes 143 can be shaded gray.

Referring to FIG. 15, a portion of a notation region 17 is shown. The notation region 17 can include a note error area 142 and missed notes 143. The notation region 17 can also include erroneously played notes 151. Erroneously played notes 151 can include notes played instead of or in addition to the correct score notes 141. Erroneously played notes 151 can be shaded in a color different from missed notes 143 and score notes 141. For example, erroneously played notes 151 can be shaded red.

Referring to FIG. 16, a portion of a notation region 17 is shown. Notation region 17 can include score notes 141 and timing error region 163. Timing error region 163 can indicate that the notes within its boundaries were played with the incorrect timing. Notes that were played early can be marked with early notes 161. Early notes 161 can be shaded notes in front of or behind the score notes 141. The early notes can be a different color than the score notes, for example, orange. Early notes 161 can be offset to the left from the score note 141 by a distance 164. The magnitude of distance 164 can indicate the extent to which the user played score note 141 earlier than prescribed by the score. Similarly, notes that were played late can be marked with late notes 162. Late notes 162 can be shaded notes in front of or behind the score notes 141. The late notes can be a different color than the score notes, for example, orange. Late notes 162 can be offset to the right from the score note 141 by a distance 165. The magnitude of distance 165 can indicate the extent to which the user played score note 141 later than prescribed by the score.

Referring to FIG. 17, a portion of a notation region 17 is shown. Notation region 17 can include guitar tablature 171 in addition to score notes 141. In embodiments where guitar tablature 171 is included in notation region 17, note error area 172 can be displayed to indicate that the notes played by the user deviated from the notes written in the score. Errors in guitar lessons can be displayed based on measures of the score and on divisions of those measures. Note error area 172 can shade the area behind or in front of the score notes 141 and the guitar tablature 171. For example, note error area 172 can be shaded red.

Referring to FIG. 18, a portion of a notation region 17 is shown. In addition to score notes 141 and guitar tablature 171, notation region 17 can also include a timing error area 181, indicating that the user played the notes indicated by the score with the wrong timing. Timing error area 181 can shade the area behind or in front of score notes 141 and the guitar tablature 171. For example, timing error area 181 can be shaded orange.

Referring to FIG. 19, a portion of a notation region 17 is shown. Notation region 17 need not display both score notes 141 and guitar tablature 171. Isolated guitar tablature 191 can be displayed on its own. A note error area 192 can indicate that the user did not play the notes indicated by the isolated guitar tablature 191. Note error area 192 can be displayed behind or in front of isolated guitar tablature 191. Note error area 192 can be shaded in any color, for example, red.

Referring to FIG. 20, a portion of a notation region 17 is shown. A timing error area 201 can indicate that the user did not play the notes indicated by the isolated guitar tablature 191 with the correct timing. Timing error area 201 can be displayed behind or in front of isolated guitar tablature 191. Timing error area 201 can be shaded in any color, for example, orange.

Referring to FIG. 21, a portion of a notation region 17 is shown. Notation region 17 can also display one or more chord grids 211 and lyrics 214. Lyrics 214 can be spaced to correspond with the timing of a song. A playhead 213 can be displayed and can be animated to move from left to right as a song is played. In embodiments where lyrics 214 are spaced to correspond with the timing of a song, playhead 213 can point to the words to be sung in real-time. Chord grid 211 can be positioned relative to the lyrics 214 such that the timing in which a chord, represented by chord grid 211, should be played can be determined by the user. Playhead 213 can also align with chord grid 211 at the appropriate instant in which the user should sound a chord represented by chord grid 211. A note error area 212 can be displayed in notation region 17, for example, in front of or behind chord grid 211, when the user plays a chord other than the chord specified by chord grid 211. The note error area 212 can be shaded in any color, for example, red. Errors can be marked for complete bars of a score.

Referring to FIG. 22, a portion of a notation region 17 is shown. In addition to including one or more chord grids 211 and lyrics 214, notation region 17 can also include a timing error area 221. As in other embodiments, timing error area 221 can be displayed as a shaded region in front of or behind chord grid 211 to indicate the user played the chord specified by chord grid 211 at an incorrect time. Timing error area 221 can be shaded in any color, for example, orange.

Referring to FIG. 23, a portion of a notation region 17 is shown. In addition to or instead of a chord grid, notation region 17 can display a chord symbol 231. As in embodiments including chord grids, playhead 213 can move along below the chord symbol 231 and above lyrics 214. If the user plays an incorrect chord, a note error area 232 can be displayed in front of or behind chord symbol 231. The note error area 232 can be shaded in any color, for example, red.

Referring to FIG. 24, a portion of a notation region 17 is shown. When a user plays a chord at an incorrect time relative to lyrics 214, notation region 17 can include a timing error area 241 in front of or behind chord symbol 231. Timing error area 241 can be shaded in any color, for example, orange.

As described above, assessment results can include a percentage value of correct notes. The percentage value of correct notes can be based on the total number of errors played and the total number of notes in the song. A percentage of pitch errors and a percentage of timing errors can also be determined separately. Each time a user plays a song, a part of a song or parts of a song, assessment results can be stored as an entry in a history database. If the user played only a part of a song, assessment results can be based on the song parts actually played. For example, even if the user only played a verse and a chorus of the lesson, assessment results, for example, percentage values, can be stored and used in a statistic.

A recording of the user's performance can be stored on a separate track. Existing recordings of user performances can be overwritten by new recordings. At every spot in the lesson, the latest performance of the user can be played back. In other words, the recording can be limited to a single "take" or performance of the entire lesson. Portions of the lesson not performed by the user can be excluded from playback. Recordings of past assessment attempts can be discarded or overwritten.

Embodiments include various systems, methods, and apparatus for reviewing and practicing a lesson. Upon completion of a lesson, or when the user ends a lesson prior to completing the entire lesson, assessment results can be displayed. Assessment lane 14, as illustrated in FIG. 1, can remain on screen when results are displayed. The assessment lane 14 can show errors quantized to bars 94, 95, and 96 as illustrated in FIG. 9. The user can click the bars 95 and 96 to review the errors associated therewith. When bar 95 or bar 96 is clicked, notation region 17, as illustrated in FIG. 1, can display the portion of the musical score associated with the bar 95 or 96. In other words, the portion of the score in which the user made an error to prompt display of the bar 95 or 96 to allow the user to review the musical score at that point. As the user reviews the musical score, the instrument region 15 can also display the correct fingerings for the chords and notes in the portion of the musical score associated with the bar 95 or 96.

Figure 25:
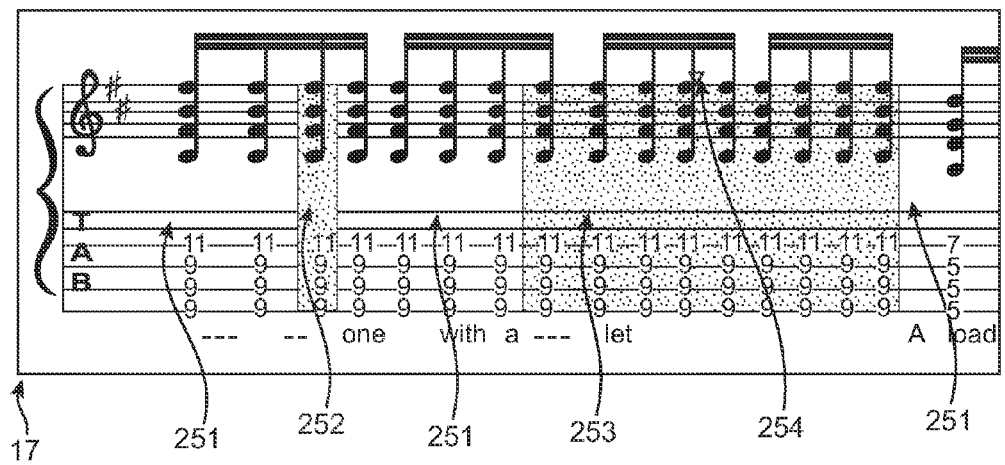

Referring to FIG. 25, a portion of a notation region 17 is shown. The notation region 17 can include the same notations during review as during real-time performance. For example, error areas 252 and 253 can be shown. The note error areas and/or the timing error areas can include a shaded region in front of or behind the notes, guitar tabs, guitar chords, guitar symbols, or lyrics of the score. The shaded region can be any color, for example, red. In addition to the error markings, the surrounding areas 251 can be marked. If a bar of the musical score contains a pitch error or a timing error, that bar can be marked with an error area 252, 253, and any number of bars prior to and after the bar containing the error can be shaded in a different color, for example, yellow. The surrounding areas 251 can include one bar prior to and one bar after the bar in which an error was detected. If less than four bars separate two successive error areas 252, 253, then the surrounding area 251 can be combined around the error areas. If more than four bars separate two successive error areas 252, 253, then error areas can be surrounded by separate surrounding areas 251. The surrounding areas 251 and the error areas 252, 253 can be selectable. When a user selects one of these areas, by clicking or mousing-over the area, playback of the portion of the score encompassed by the selected area can be cycled to allow the user to practice the selected area. When the selected area is cycled, loop control 85, as illustrated in FIG. 8, can be enabled, and the playhead 254 can return to the beginning of the selected area after reaching the end of the selected area. In this manner, the user can repeatedly practice the selected area. In some embodiments, if the error area occupies at least a predetermined number of bars, only the portion of the score encompassed by a selected error area is cycled. The predetermined number of bars can be any number, for example, from 1 to 20. In other embodiments, the entire portion of the score encompassed by the surrounding area 251 is cycled when a user selects either an error area 252, 253 or the surrounding area 251.

The area of the score to be cycled, i.e. the cycle region, can also be adjusted by the user. For example, the user can click and drag an endpoint of the selected area to cover a smaller or larger portion of the musical score. The area to be cycled can be shown in front of or behind the error areas as a differently shaded region. In some embodiments, the user can adjust the position of a cycle region within a score. When a user clicks a defined cycle region and drags it to the left or to the right within the score, the cycle region can move. The cycle region can move by any increment, for example, by $\frac{1}{16}$ notes. The length of the cycle region can be maintained after the cycle region has been moved.

At any point during the cycling of the playback of the selected area, the user can then restart assessment. For example, the user can restart assessment at any time during playback, by clicking record control 83, as illustrated in FIG. 8. When the user restarts assessment, assessment will be done in the background. In some embodiments, as soon as the user plays the cycled area without error, the cycled area can be marked differently in the notation, for example, by a change of color to green. The user can continue to practice the selected area even after it has been played correctly and marked differently. After practicing a particular area, the user can select another portion of the score to practice.

Figure 26:
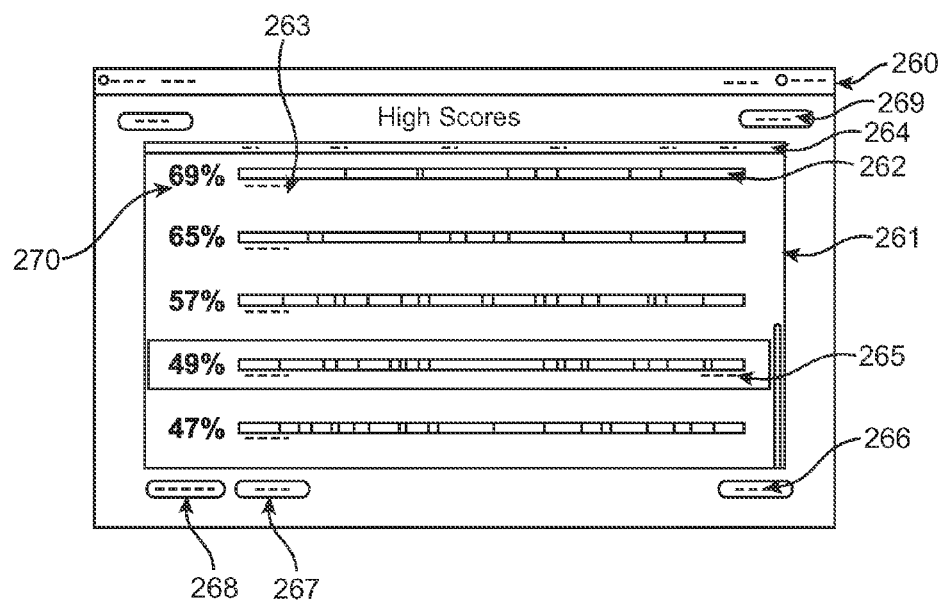
FIG. 26 depicts a schematic view of a user interface including an assessment results view.

Referring to FIG. 26, an additional user interface can be provided to enable users to review stored assessment attempts. The user interface can include an assessment results view 260. The assessment results view 260 can include a list 261 showing a number of assessment attempts for a particular lesson, track, song, or score. For example, the list 261 can include the top five assessment attempts sorted by percentage result value 270. In addition to a percentage result value 270, each assessment attempt can include a condensed assessment strip 262, which can graphically display portions of a song in which pitch or timing errors occurred. To assist the user in determining where the timing and pitch errors, displayed in assessment strip 262, occurred within the song, list 261 can include a song part bar 264. Song part bar 264 can include score segments representing sections of a musical score, for example, introduction, verse, chorus, bridge, and/or refrain. Song part bar 264 can have a length proportional to the duration of the entire song and each score segment can have a length proportional to the duration of the section of the song it represents. Each assessment attempt can also include a date and time stamp 263, displaying the date and/or the time on which the assessment attempt was started and/or finished. A functionality can be provided whereby, when a user double-clicks an assessment attempt entry the list 261 switches back to the main assessment interface 11 and displays the results for the assessment entry, or a full-page view of the notation can be displayed for the assessment attempt. A review lesson button 265 can be shown, for example on the right of the currently selected assessment attempt in list 261. Clicking the review lesson button 265 can have the same effect as double-clicking an assessment attempt entry. Assessment results view 260 can also include a play again button 266, which, when clicked, lets the user switch back to the main assessment interface 11 and displays the most recently performed assessment attempt. A reset lesson button 267, and an open in digital audio workstation button 268 can also be displayed in assessment results view 260. When clicked, open in digital audio workstation button 268 can prompt the system to open the current lesson in a digital audio workstation. When clicked, reset lesson button 267 can prompt a complete reset of the lesson. A complete reset can include erasing all assessment related data created by the user along with general settings, like the user's position within the lesson, view settings, user recordings, and mixer signals. The complete reset can reset both the High Score and Progress displays and erase all the user's recordings for the lesson. The result of a complete reset can be the same as starting the lesson for the very first time.

Figure 27:
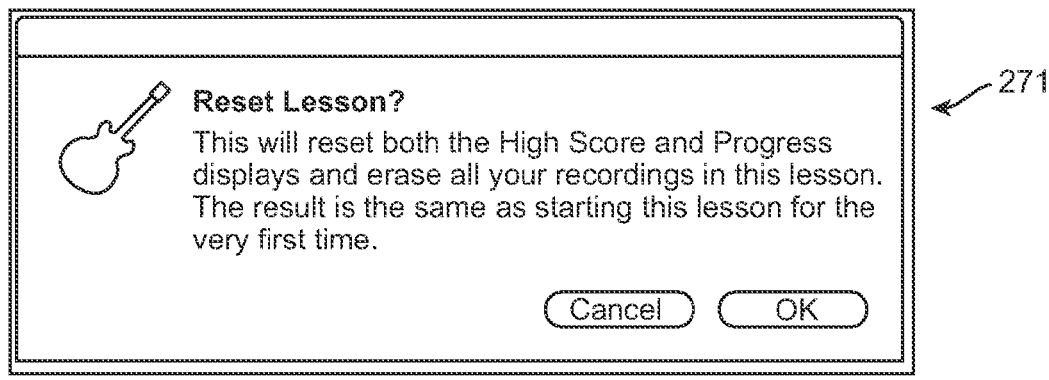
FIG. 27 depicts a schematic view of a dialog box.

Referring to FIG. 27, a dialog box 271 is shown. Dialog box 271 can inform the user about the consequences of completely resetting the data stored for the lesson. Dialog box 271 can be displayed automatically when reset lesson button 267 is clicked.

Referring again to FIG. 26, assessment results view 260 can also include a show progress chart button 269. When clicked progress chart button 269 can prompt the display of a progress chart.

Figure 28:
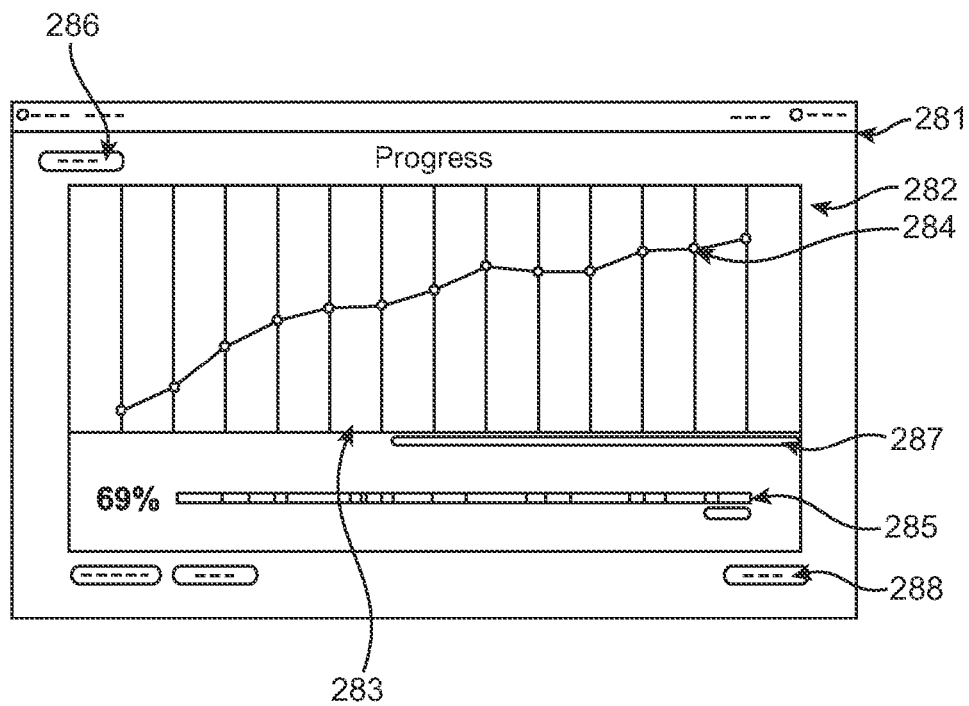
FIG. 28 depicts a schematic view of a progress chart user interface.

Referring to FIG. 28, progress chart 281 is shown. The progress chart 281 can plot the assessment result percentage 282 over time 283. Each assessment attempt 284 can be displayed as a unique point. The progress chart 281 can interpolate between assessment attempts 284. Information about the time when each assessment attempt was produced can also be displayed or outlined on or near the chart. Each attempt 284 can be selectable. When a user selects an attempt 284, for example, by double-clicking it, an assessment strip 285 for the selected attempt 284 can be displayed near the chart. By default, an assessment strip 285 for the most recent assessment attempt 284 can be displayed. A back to high scores button 286 can be displayed near the chart to allow a user to navigate back to the assessment results view 260. In cases there are more assessment attempts than can fit on the screen horizontally, a horizontal scrollbar 287 can be provided. Scrollbar 287 can allow a user to scroll through time 283 to view attempts 284 that do not fit on the screen. An email results button 288 can be provided to allow the user to send his or her results via email. An affordance can call up mail, a new email can be created, and an HTML version of the overall chart 281 and the list 261 can be inserted into the body of the email.

Figure 29:
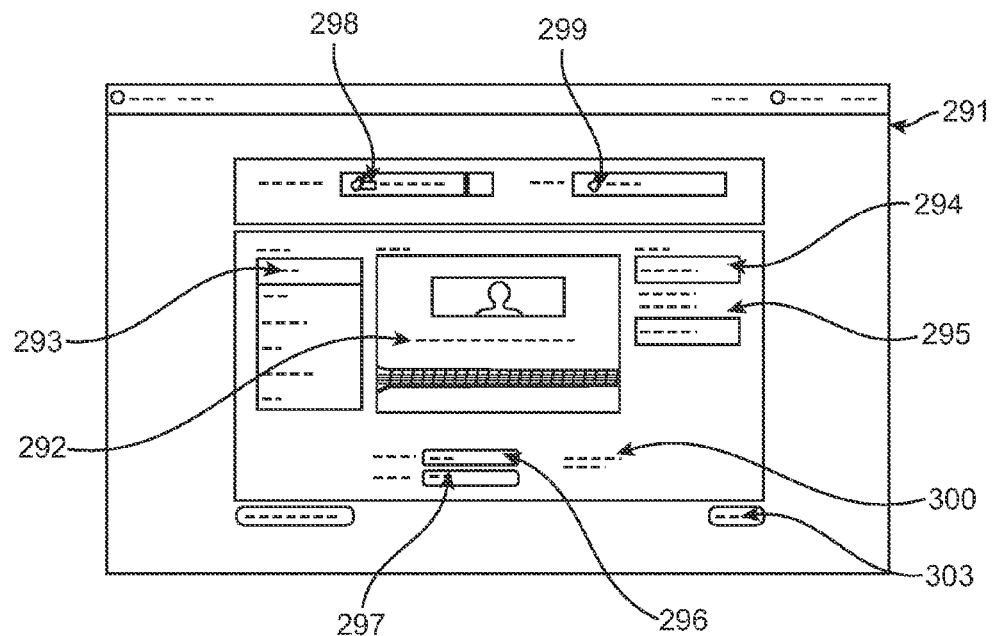
FIG. 29 depicts a schematic view of a setup page for an assessment user interface.

Referring to FIG. 29, a schematic view of a setup page 291 for an assessment user interface is shown. The setup page 291 can include a preview area 292. Preview area 292 can be displayed in the middle of the setup page 291. The preview area 292 can display a representation of how the view settings selected will look in the main assessment user interface. The setup page 291 can include notation view settings 293, device input settings 298, monitor settings 299, show instrument settings button 294, subtitle settings 297, voice over settings 296, and a real-time assessment toggle setting 300. Notation view settings 293 can include settings specifying how the notation of a musical score will be displayed. For example, notation view settings 293 can include settings to display a musical score alone, a musical score plus guitar tablature, guitar tablature alone, guitar chords alone, or guitar chord symbols alone. Notation view settings 293 can also include an option to display the notation as a full-page or as a notation region 17 of an assessment user interface 11. Device input settings 298 can allow a user to specify a type of musical instrument and a type of input. For example, a USB MIDI device, a USB instrument, or a USB microphone for inputting the sounds of a non-wired instrument. Monitor settings 299 can allow a user to specify whether an input signal should be sounded on system audio output devices. For example, monitor settings 299 can allow a user to specify that speakers should sound the notes played on a MIDI keyboard in real-time during an assessment. Show instrument settings button 294 can include options to control which instrument is displayed in instrument region 15. For example, a piano keyboard or a guitar fretboard can be displayed in instrument region 15 based on the settings selected in instrument settings 294. Additional options 295 for a given instrument can be revealed under the show instrument settings button 294. The additional options 295 can allow a user to select from among various views of a particular instrument. For example, a user can select the angle at which a guitar fretboard is displayed. Subtitle settings 297 can allow a user to specify whether a subtitle is displayed in the assessment user interface. A subtitle can include real-time instructions or commentary from an instructor or lyrics of a song. Voice over settings 296 can allow a user to specify whether a voice over track should be played or recorded during an assessment. Real-time assessment toggle setting 300 can be a checkbox or any other suitable toggle. Setting 300 can allow a user to switch on or off the real-time assessment of a musical performance. Setting 300 can be labeled "Show real-time assessment". If setting 300 is enabled during assessment or recording, various real-time assessment features can be disabled. When setting 300 is enabled, notation region 17 can remain unchanged and not display any errors during playback. When setting 300 is enabled, the instrument region 15 can remain unchanged and not display errors during playback. When setting 300 is enabled, rating region 12 can remain unchanged and not show any percentage value 51 and/or any graphical depiction 22 during playback. When setting 300 is enabled, assessment lane 14 can remain unchanged and not show any colors during playback. In one embodiment, when setting 300 is enabled playhead 18 will continue to move from left to right through the score during playback. When the lesson is completed or the user stops recording, errors can be displayed in the notation region 17 and the instrument region 15, ratings can be displayed in the rating region 12, and pitch errors and timing errors can be displayed in assessment lane 14. Setting 300 can be enabled or disabled by default.

Figure 30:
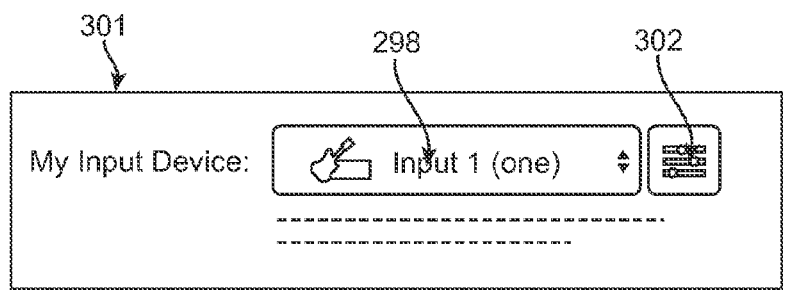
FIG. 30 depicts a schematic view of a device input portion of a setup page.

Referring to FIG. 30, a device input portion 301 of setup page 291 is shown. As already discussed, device input portion 301 can include device input settings 298. Device input portion 301 can also include a third-party music hardware/software setup button 302. When clicked, button 302 can prompt the display of a separate setup window to allow a user to specify the settings for third-party hardware or software. For example, button 302 can prompt the display of a separate setup window to allow a user to specify the settings for hardware or software provided by a manufacturer of computer audio recording interfaces for musicians, producers and engineers.

Referring again to FIG. 29, a done button 303 can be provided to allow a user to save changes and to exit the setup page 291. Upon exiting the setup page 291, the assessment user interface for the user's most recent lesson can be displayed. The done button can take any form, for example a back button, represented by a left arrow, or a close button, represented by an "x".

To assist users who want to focus on reading musical notation while learning their instrument, a full-page notation view can be provided as an optional alternative to the main assessment. The full-page notation view can show the notation of the musical score. The musical score notation can be depicted on one or more sheets or columns. Full-page notation can be restricted to the play chapter of a lesson. For other chapters, the view specified in setup page 291 can be used. When full-page notation is enabled the show instrument settings button 294 can be disabled, such that no instrument is shown. Clicking the show instrument settings button 294 can switch off full-page notation. A separate button for showing the instrument can be displayed within the full-page notation view user interface.

Figure 31:
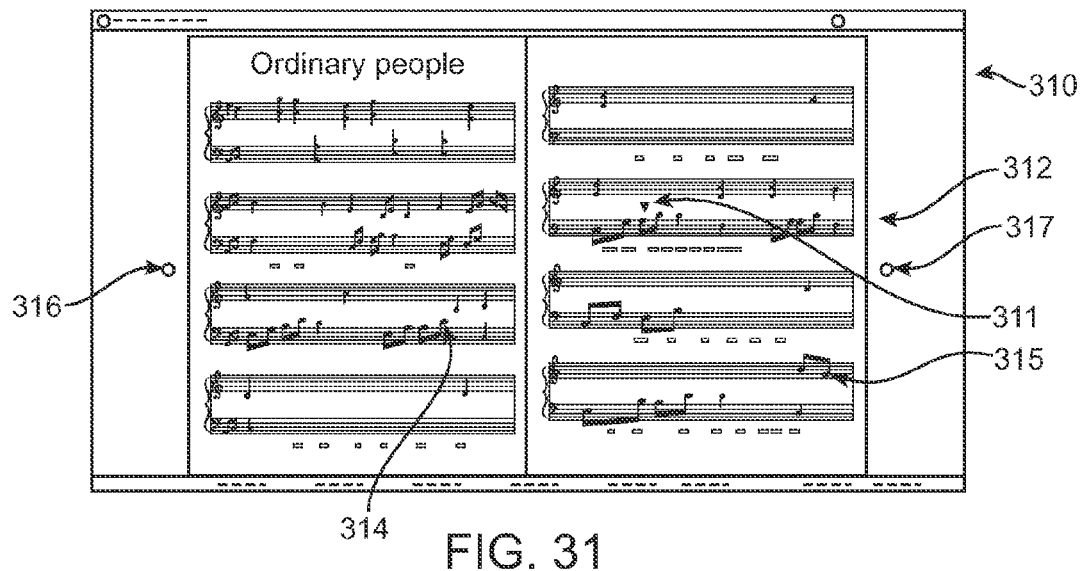
FIG. 31 depicts a schematic of a full-page notation view user interface.

Referring to FIG. 31, a full-page notation view user interface 310 is shown. Once enabled the full-page notation view user interface 310 can occupy all or most parts of the main assessment user interface 11. For example, the movie region 16, the notation region 17, the instrument region 15 can all be occupied by the full-page notation view user interface 310. The assessment lane 14, the rating region 12, and the control region 13 can remain displayed. Score segments 91 can remain displayed as well, along with a timeline, which can correspond to, overlap with, or be provided in addition to the assessment lane 14. The full-page notation view user interface 310 can include two static pages 312 displayed side-by-side. Static pages 312 can have a fixed aspect ratio that can be scaled to fit different screen resolutions. The full-page notation view user interface can display playhead 311. Playhead 311 can move through the score automatically in time with the score. The user can reposition playhead 311 to any position within the score to restart the score at that point. If the user repositions playhead 311 during playback or recording, the playhead 311 can automatically continue to scroll through the score. If the user repositions the playhead 311 while the lesson is stopped, the playhead 311 can stay in place after being repositioned. Full-page notation view user interface 310 can also allow the user to specify a portion of the score to cycle or loop. The user can specify the portion of the score to be cycled by highlighting the portion of the score to be cycled or by positioning markers at the endpoints of the portion of the score to be cycled. Full-page notation view user interface 310 can also display pitch error indications 314 just as in the notation region 17 of the main assessment user interface 11. Full-page notation view user interface 310 can also display timing error indications 315 just as in the notation region 17 of the main assessment user interface 11. Full-page notation view user interface 310 can also include a next page button 317 and a previous page button 316 to allow the user to move through pages of a musical score.

Figure 32:
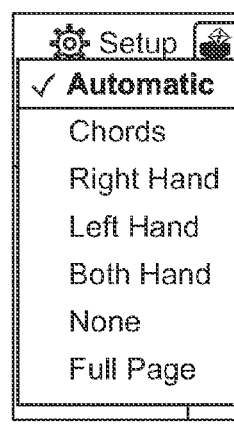
FIG. 32 depicts a schematic of a drop down menu for selecting notation views.

Referring to FIG. 32, a dropdown menu 320 is shown. Dropdown menu 320 can be included as part of the main assessment user interface 11. Dropdown menu 320 can enable a user to activate full-page notation view user interface 310. The Dropdown menu can also allow a user to specify other display options for notation region 17. For example, a user can specify that only chords should be displayed, that the portion of a piano score played with the right hand, with the left hand, or with both hands should be displayed, or that no notation should be displayed. The dropdown menu can also allow a user to specify that the notation region 17 should automatically display a recommended notation view. The recommended notation view can be based on other settings specified by the user, for example, the settings specified in setup page 291.

Referring again to FIG. 31, if an entire score cannot be displayed in full-page notation view user interface 310, then during playback or recording of a score, the notation may need to be paged. Paging can take place as soon as the playhead 311 reaches the right page. When the pagehead 311 reaches the right page, both pages 312 can shift to the left by one page so that the play head then runs on the left of the two pages 312 and the user will see the upcoming score on the right page. Alternatively, paging can take place only when the playhead 311 reaches the bottom of the right page 312. Paging can include an animation. For example, an animation of the pages shifting to the left can be displayed or an animation of the pages turning, as in a book, can be displayed.

Figure 33:
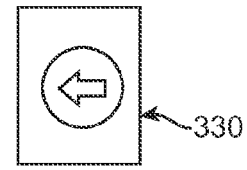
FIGS. 33 and 34 depict an illustrations of a paging buttons.
Figure 34:
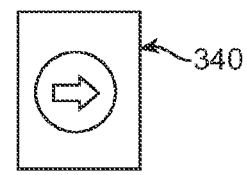

When the lesson is stopped, i.e. when the score is not being played or recorded, the pages can be turned manually. A dimmed previous page button 330 is shown in FIG. 33 and a next page button 340 is shown in FIG. 34. Clicking previous page button 330 can move the whole notation area to the right by one page. Clicking next page button 340 can move the whole notation to the left by one page. When the current view is at the beginning or at the end of the lesson or score, the relevant page button can be dimmed. FIG. 34 illustrates a normal, i.e., non-dimmed, next page button 340.

A database of glossary subjects can be stored in memory, according to various embodiments. Glossary subjects can offer the user topics or training that are valid for several or all lessons. Glossary subjects can be a global area, independent from any specific lesson. The glossary subjects can help improve skills and can offer knowledge about topics that are on a more general level than the specifics of a lesson. For example, information on core playing techniques or chord training can be provided as glossary subjects. Glossary subjects can include video, pictures, and text. Glossary subjects can be authored as HTML files that can be displayed by a digital audio workstation as a web view. The content for the lessons stored as glossary subjects can be streamed from a server or stored on a local device.

Topics from within the glossary subject database can be offered to a user interactively during the course of a lesson. Topics can be linked to the parts of a lesson, where they are most relevant. For example, in a lesson that includes a score requiring the user to play a glissando, i.e., a glide from one pitch to another, a glossary subject topic on techniques for executing a glissando could be suggested from within the assessment user interface 11 or in the chord trainer user interface. Glossary subjects can also be provided using a static, as opposed to an interactive, approach. A new button in the top row of the user interface can be provided to switch the user interface to a glossary interface. When the new button is selected, the area below the top bar can display a web view, including pre-produced HTML files. The first page can offer the top navigation level through the glossary subjects. The navigation can have any number of levels. For example, the glossary can have up to three levels. On the lowest level, the user can select the single subjects.

Figure 35:
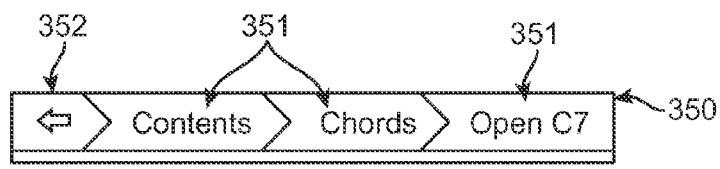
FIG. 35 depicts a schematic of a glossary navigation bar.

Referring to FIG. 35, a glossary navigation bar 350 is shown. Glossary navigation bar 350 can include various hierarchy level tabs 351 and a back button 352. By clicking on the hierarchy level tabs 351, the user can jump back to higher levels of the navigation. Back button 352 can allow the user to switch back to the previous lesson.

The glossary subjects can be single, isolated topics that can be global to the current lesson. For example, glossary subjects can include topics such as "holding a pick," or "note names on staff." The glossary subjects can be selected in HTML navigation. The glossary topics can be presented as still graphics, including text and graphic charts, and/or as video. If the glossary topic includes video, video navigation controls can be provided as well as a volume control.

Figure 36:
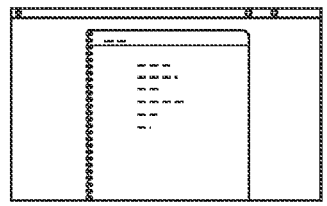
FIGS. 36-39 depict schematic views of glossary subject pages.

Referring to FIG. 36, an example of a glossary topic page is shown, depicting a top level HTML navigation of various other glossary subjects. The HTML navigation can include hyperlinks to other glossary subject pages.

Figure 37:
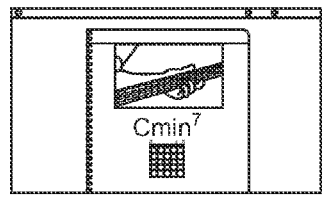

Referring to FIG. 37, an example of a glossary topic page is shown, depicting a movie and a graphic. The graphic is a guitar chord grid. The movie can provide a demonstration of how to form the chord grid on a guitar fretboard, as well as the sound produced by playing the chord depicted in the chord grid.

Figure 38:
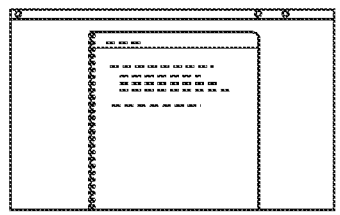

Referring to FIG. 38, an example of a glossary topic page is shown, depicting explanatory or education text with links to other glossary subject pages and/or to pages on the world wide web.

Figure 39:
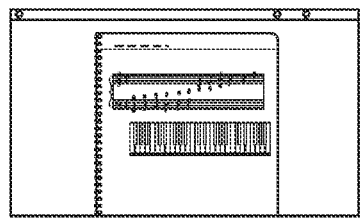

Referring to FIG. 39, an example of a glossary topic page is shown, depicting a graphic. The graphic can show a musical score and a piano keyboard, illustrating the positions of the notes of the musical score. The graphic can be animated to advance through the score. The piano keyboard can also be animated, and can be shown to play along with the musical score.

According to some embodiments, ornamentations can be displayed in the notation area. For example, ornamentations can be displayed in notation area 17, as illustrated in FIG. 1, in full-page view as illustrated in FIG. 31, or in any other display area that includes musical notations, such as musical ledgers, chord grids, or guitar tablatures. Ornamentations can also be authorable by the user.

Figure 40:
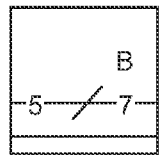
FIGS. 40-59 depict illustrations of various musical ornamentations.

Referring to FIG. 40, an illustration of a guitar tablature ornamentation is shown, the ornamentation indicates a bend. Bends can include an indication of how far to bend the note. For example, ¼ step, ½ step, or a whole step.

Figure 41:
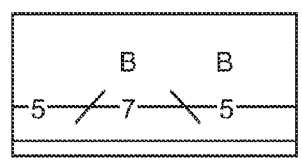

Referring to FIG. 41, an illustration of a guitar tablature ornamentation is shown, the ornamentation indicates a pre-bend and a release bend. The pre-bend can indicate how far to bend a note.

Figure 42:
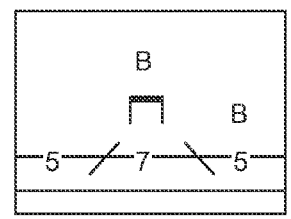
Figure 57:
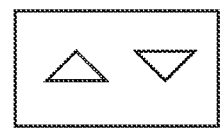

Referring to FIG. 42, an illustration of a guitar tablature ornamentation is shown, the ornamentation indicates a bend up in pitch, following a striking of the note, then a bend back down to the original note. The same or a similar indication could be achieved using an additional up or down strum symbol, as illustrated in FIG. 57.

Figure 43:
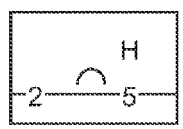

Referring to FIG. 43, an illustration of a guitar tablature ornamentation is shown, the ornamentation indicates a hammer-on.

Figure 44:
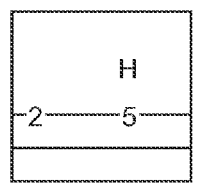

Referring to FIG. 44, an illustration of a guitar tablature ornamentation is shown, the ornamentation indicates a hammer-on.

Figure 45:
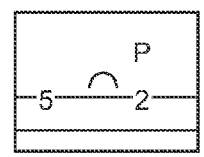

Referring to FIG. 45, an illustration of a guitar tablature ornamentation is shown, the ornamentation indicates a pull-off.

Figure 46:
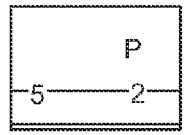

Referring to FIG. 46, an illustration of a guitar tablature ornamentation is shown, the ornamentation indicates a pull-off.

Figure 47:
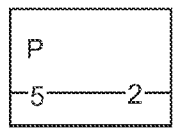

Referring to FIG. 47, an illustration of a guitar tablature ornamentation is shown, the ornamentation indicates a pull-off.

Figure 48:
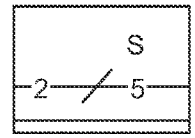

Referring to FIG. 48, an illustration of a guitar tablature ornamentation is shown, the ornamentation indicates a slide up to a note.

Figure 49:
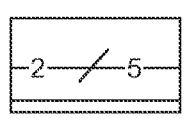

Referring to FIG. 49, an illustration of a guitar tablature ornamentation is shown, the ornamentation indicates a slide up to a note.

Figure 50:
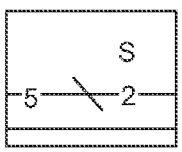

Referring to FIG. 50, an illustration of a guitar tablature ornamentation is shown, the ornamentation indicates a slide down to a note.

Figure 51:
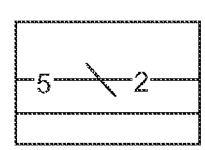

Referring to FIG. 51, an illustration of a guitar tablature ornamentation is shown, the ornamentation indicates a slide down to a note.

Figure 52:
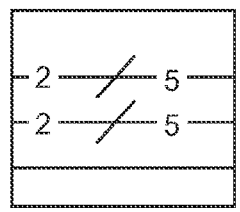

Referring to FIG. 52, an illustration of a guitar tablature ornamentation is shown, the ornamentation indicates a slide between two notes.

Figure 53:
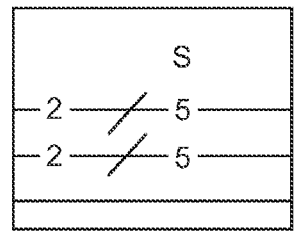

Referring to FIG. 53, an illustration of a guitar tablature ornamentation is shown, the ornamentation indicates a slide between two notes.

Figure 54:
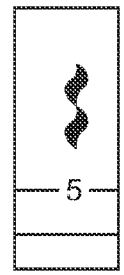

Referring to FIG. 54, an illustration of a guitar tablature ornamentation is shown, the ornamentation indicates a note played with vibrato.

Figure 55:
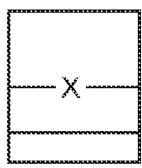

Referring to FIG. 55, an illustration of a guitar tablature ornamentation is shown, the ornamentation indicates a dead strum or muted note. An "x" rather than an actual note head, can indicate a dead strum or muted note.

Figure 56:
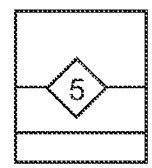

Referring to FIG. 56, an illustration of a guitar tablature ornamentation is shown, the ornamentation indicates a harmonic note.

Any other desirable ornamentation can be displayed. For example, pinch harmonics, grace notes, trills, and whammy bar up and down can also be indicated with ornamentations.

Left-handed individuals often restring guitars so that the left-hand strums the strings and the right-hand depresses the strings along the fretboard. Notation for the right hand can be added to lessons. Right hand notation can be shown in the notation alone or in both the notation and on the fretboard.

Referring to FIG. 57, an illustration of guitar tablature ornamentations are shown, the ornamentations indicate the directing of picking or strumming guitar strings. Guitar strings can be strummed up or down.

Figure 58:
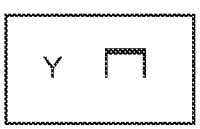

Referring to FIG. 58 an illustration of guitar tablature ornamentations are shown, the ornamentations indicate the directing of picking or strumming guitar strings.

Figure 59:
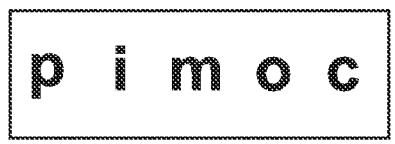

Fingerpicking is a technique for playing a stringed instrument, such as a guitar. The fingers can pluck upward into the hand and the thumb can pluck downward. The fingers and the thumb can strum in both directions. Referring to FIG. 59, an illustration of a guitar tablature ornamentation is shown, the ornamentation indicates symbols for fingerpicking. The symbols refer to Spanish words. The thumb is indicated by the letter, "p," which stands for "pulgar." The index finger is indicated by the letter, "i," which stands for "indio." The middle finger is indicated by the letter, "m," which stands for "medio." The ring finger is indicated by the letter, "a," which stands for "anular." The pinkie is indicated by the letter, "c," which stands for "chiquita."

Figure 60:
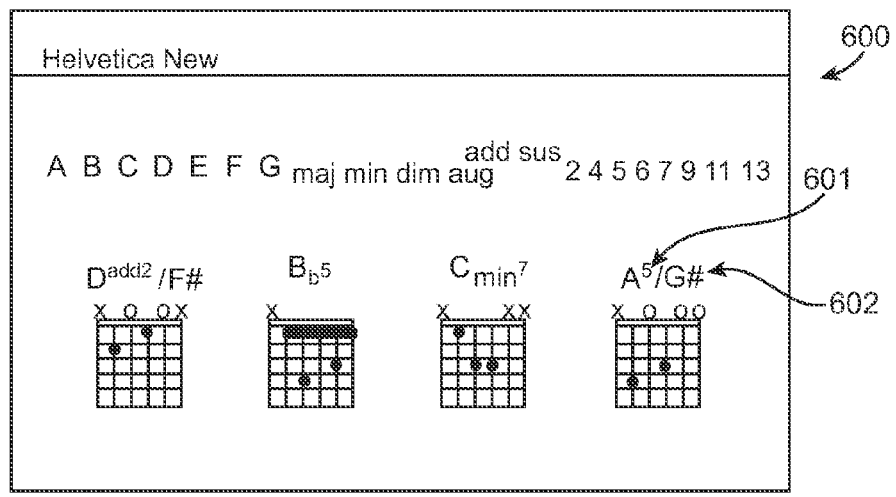
FIG. 60 illustrates chord grid styles and fonts.

Fonts used in the notation can be set with a default style. For example, "Helvetica New" can be used as a default font. Referring to FIG. 60, an illustration 600 of chord grid styles and fonts is shown. Chord grids can be annotated with symbolic representations of the chords. For example, alphanumeric chord names can be assigned. A symbol for the main chord 601, illustrated in the chord grid can be shown. A symbol for a base chord 602 can also be shown. Base notes or chords 602 can be on the same level as the main chord 601. The main chord and the base chord can be separated by a slash. The fonts can be adjusted.

Figure 61:
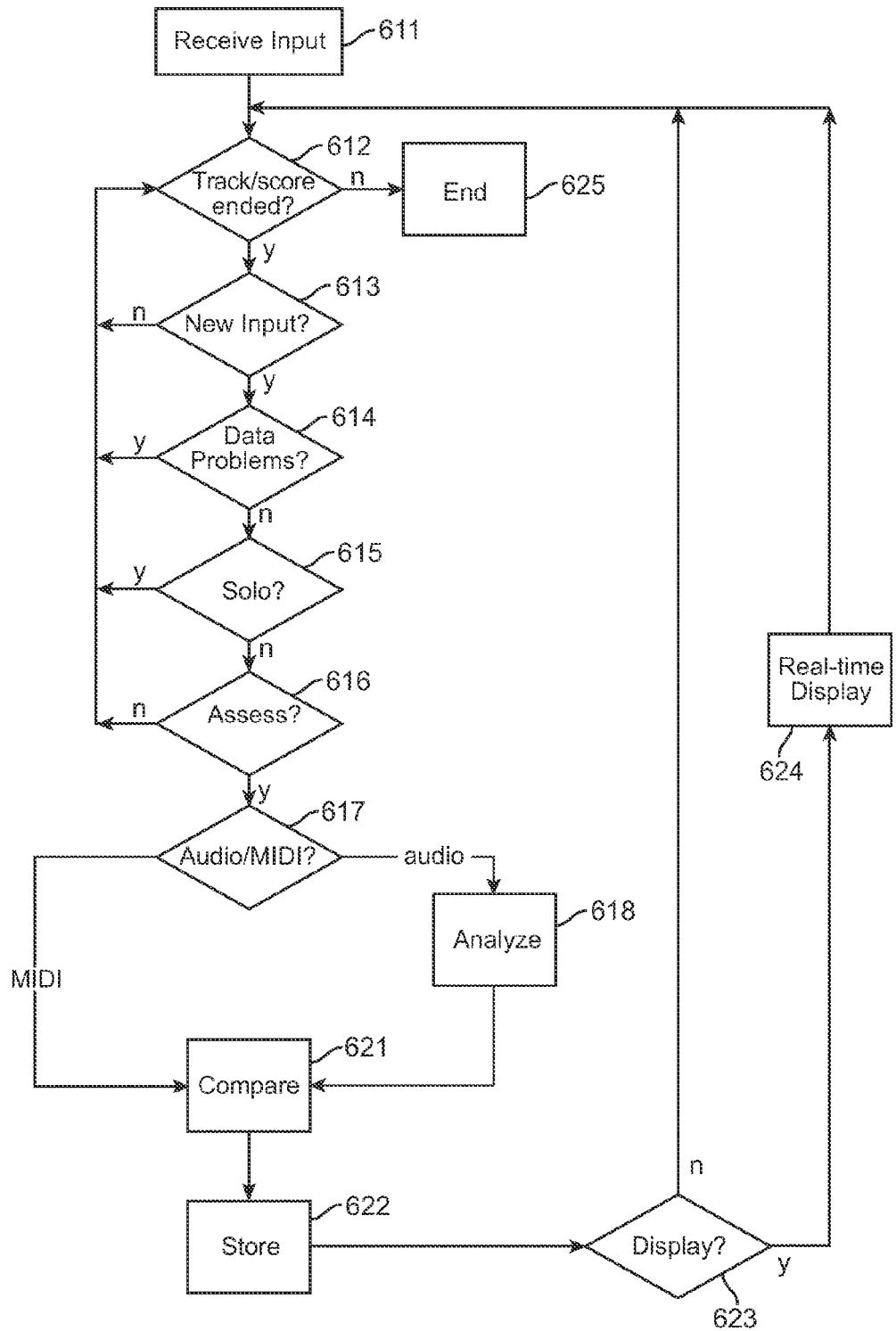
FIG. 61 depicts a flowchart, illustrating various embodiments.

Referring to FIG. 61, a flow chart is shown, illustrating various embodiments. An input can be compared in real-time with a score and/or with a track, and assessment results can be obtained. An input can be received at box 611. A determination can be made at box 612 as to whether the musical score or track has ended at the time the input is received. If the musical score or track has already ended, the assessment can end at box 625. If the musical score or track has not already ended when the input is received, a determination can be made at box 613 as to whether the input is a new input. If the input has already been evaluated, it is not a new input, and another determination can be made at box 612 for any subsequent inputs. If the input has not been evaluated, it is a new input, and a determination can be made at box 614 as to whether any data discrepancies exist between the musical score and the musical track. If the musical score does not match the musical track, then a data discrepancy exists, and another determination can be made at box 612 for any subsequent inputs. If the musical score matches the musical track or if only a musical score or a musical track is available, then a data discrepancy does not exist and a determination can be made at box 615 as to whether the musical score or musical track specifies a solo at the moment the input is received. If the score or track specifies a solo, another determination can be made at box 612 for any subsequent inputs. If the score or track does not specify a solo, a determination can be made at box 616 as to whether the user desires the input to be assessed. If the user has indicated that the input should not be assessed, another determination can be made at box 612 for any subsequent inputs. If the user has indicated that the input should be assessed, a determination can be made at box 617 as to whether the input is an audio signal or a MIDI signal. If the input is an audio signal, then the audio signal can be analyzed at box 618. After the audio signal is analyzed at box 618, it can be compared with the musical score and/or the musical track at box 621. If the input is a MIDI signal, it can be compared with the musical score and/or the musical track at box 621 without any analysis. After the input has been compared to the musical score or musical track, the results of the comparison can be stored, for example, in memory at box 622. After the results are stored, a determination can be made at box 623 as to whether the user desires the results to be displayed. If the user desires the results to be displayed, the results can be displayed in real-time at box 624. After the results are displayed at box 624, another determination can be made at box 612 for any subsequent inputs. If the user does not want the results to be displayed, another determination can be made at box 612 for any subsequent inputs.

This disclosure includes flowcharts, however the flowcharts are not to be construed as requiring a particular order for the activities shown therein, or that all activities must or should be present in a particular embodiment, or that other activities cannot be added. Further, such activities need not necessarily be discretized in the way shown by these examples, but rather such activities can be implemented in more or fewer actions, or equivalents of such activities can be implemented in some embodiments.

Isolation of one flowchart from another or isolation of elements within a flowchart does not require or imply that these methods would execute in isolation, but rather in implementations, code according to such flowcharts can be implemented to cooperate, and in some cases, such code can use or rely on services and functions centrally provided, such as by an operating system. As such, these flowcharts do not imply the existence of discrete functional or code modules for methods according to these examples.

The technology can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized and/or distributed as known to those skilled in the art.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

We claim:

1. A method for providing instruction and assessing a musical performance, the method comprising:
    displaying a musical composition on a first region of a display device;
    displaying on a separate second region of said display device a performance of said musical composition on a musical instrument for teaching a user how to perform said musical composition on said musical instrument;

receiving an indication from a user of a start of a musical performance by said user of said musical composition;

displaying a timing guide on said displayed musical composition in response to said indication;

receiving an input corresponding to a real-time performance of said displayed musical composition by said user with respect to said displayed timing guide;

comparing the input to notes of said displayed musical composition; and displaying a real-time assessment of the real-time musical performance as a result of said comparing, wherein displaying the real-time assessment includes displaying a performance rating that includes a graphical depiction.

2. The method of claim 1, where the graphical depiction includes a circle graphic with colored concentric bands that indicate a percentage of correct notes played.

3. The method of claim 1, where the graphical depiction includes an overall performance rating that indicates notes played correctly as a percentage of a total number of notes in a part of the musical composition.

4. The method of claim 3, where the appearance of the overall performance rating changes depending on a direction of change of the percentage value.

5. The method of claim 1, where the graphical depiction includes score segments representing sections of the musical composition separated by one or more dividers, where each score segment has a length proportional to a duration of the section.

6. The method of claim 1, further comprising a movie region including one or more views.

7. The method claim 1, further comprising a notation region displaying score notes and a note error area that includes a shaded region behind or in front of score notes that were not played correctly.

8. The method of claim 1, further comprising:
pausing the displaying of the real-time assessment when a solo in the musical composition is reached.

9. A non-transitory computer-readable storage medium for storing instructions, which, when executed by one or more processors, causes the one or more processors to perform operations comprising:

displaying a musical composition on a first region of a display device;

displaying on a separate second region of said display device a performance of said musical composition on a musical instrument for teaching a user how to perform said musical composition on said musical instrument;

receiving an indication from a user of a start of a musical performance by said user of said musical composition;

displaying a timing guide on said displayed musical composition in response to said indication;

receiving an input corresponding to a real-time performance of said displayed musical composition by said user with respect to said displayed timing guide;

comparing the input to notes of said displayed musical composition; and displaying a real-time assessment of the real-time musical performance as a result of said comparing, wherein displaying the real-time assessment includes displaying a performance rating that includes a graphical depiction.

10. The computer-readable storage medium of claim 9, where the graphical depiction includes a circle graphic with colored concentric bands that indicate a percentage of correct notes played.

11. The computer-readable storage medium of claim 9, where the graphical depiction includes an overall performance rating that indicates notes played correctly as a percentage of a total number of notes in a part of the musical composition.

12. The computer-readable storage medium of claim 11, where the appearance of the overall performance rating changes depending on a direction of change of the percentage value.

13. The computer-readable storage medium of claim 9, where the graphical depiction includes score segments representing sections of the musical composition separated by one or more dividers, where each score segment has a length proportional to a duration of the section.

14. The computer-readable storage medium of claim 9, further comprising a movie region including one or more views.

15. The computer-readable storage medium of claim 9, further comprising a notation region displaying score notes and a note error area that includes a shaded region behind or in front of score notes that were not played correctly.

16. The computer-readable storage medium of claim 9, further comprising:
pausing the displaying of the real-time assessment when a solo in the musical composition is reached.

17. A system comprising:
one or more processors;

memory coupled to the one or more processors and configured to store instructions, which, when executed by the one or more processors, causes the one or more processors to perform operations comprising:

displaying a musical composition on a first region of a display device;

displaying on a separate second region of said display device a performance of said musical composition on a musical instrument for teaching a user how to perform said musical composition on said musical instrument;

receiving an indication from a user of a start of a musical performance by said user of said musical composition;

displaying a timing guide on said displayed musical composition in response to said indication;

receiving an input corresponding to a real-time performance of said displayed musical composition by said user with respect to said displayed timing guide;

comparing the input to notes of said displayed musical composition; and displaying a real-time assessment of the real-time musical performance as a result of said comparing, wherein displaying the real-time assessment includes displaying a performance rating that includes a graphical depiction.

18. The system of claim 17, where the graphical depiction includes a circle graphic with colored concentric bands that indicate a percentage of correct notes played.

19. The system of claim 17, where the graphical depiction includes an overall performance rating that indicates notes played correctly as a percentage of a total number of notes in a part of the musical composition.

20. The system of claim 19, where the appearance of the overall performance rating changes depending on a direction of change of the percentage value.

21. The system of claim 17, where the graphical depiction includes score segments representing sections of the musical composition separated by one or more dividers, where each score segment has a length proportional to a duration of the section.

22. The system of claim 17, further comprising a movie region including one or more views.

23. The system claim 17, further comprising a notation region displaying score notes and a note error area that includes a shaded region behind or in front of score notes that were not played correctly.

24. The system of claim 17, where the instructions cause the one or more processors to perform the operation of:
    pausing the displaying of the real-time assessment when a solo in the musical composition is reached.

* * * * *

UNITED STATES PATENT AND TRADEMARK OFFICE
CERTIFICATE OF CORRECTION

PATENT NO. : 8,785,757 B2
APPLICATION NO. : 13/725824
DATED : July 22, 2014
INVENTOR(S) : Stefan Pillhofer et al.

It is certified that error appears in the above-identified patent and that said Letters Patent is hereby corrected as shown below:

In the Claims

Column 19, Line 34, Claim 7; replace:
"The method claim 1, further comprising a notation" with
-- The method of claim 1, further comprising a notation --

Column 21, Line 1, Claim 23; replace:
"The system claim 17, further comprising a notation" with
-- The system of claim 17, further comprising a notation --

Signed and Sealed this
Tenth Day of February, 2015

Michelle K. Lee
*Deputy Director of the United States Patent and Trademark Office*